United States Patent
Lyle et al.

(10) Patent No.: US 6,950,270 B2
(45) Date of Patent: Sep. 27, 2005

(54) ADAPTIVE INDEX REFERENCE POSITION QUALIFICATION

(75) Inventors: Ryan T. Lyle, Oklahoma City, OK (US); David C. Waugh, Oklahoma City, OK (US); James W. Dulaney, Oklahoma City, OK (US); Jeffrey D. Andress, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 286 days.

(21) Appl. No.: 10/279,134

(22) Filed: Oct. 23, 2002

(65) Prior Publication Data

US 2003/0197971 A1 Oct. 23, 2003

Related U.S. Application Data

(60) Provisional application No. 60/373,978, filed on Apr. 18, 2002.

(51) Int. Cl.[7] ............................................. G11B 5/596
(52) U.S. Cl. .................... 360/78.04; 360/70; 360/78.11
(58) Field of Search .............. 360/59, 75, 78.04–78.08, 360/78.14, 70, 77.01, 77.08, 78.01, 78.09, 78.11

(56) References Cited

U.S. PATENT DOCUMENTS

| | | |
|---|---|---|
| 4,584,622 A | 4/1986 | Crosby et al. |
| 4,933,786 A | 6/1990 | Wilson |
| 4,956,727 A | 9/1990 | Bezinque et al. |
| 5,047,880 A | 9/1991 | Ohno |
| 5,136,439 A | 8/1992 | Weispfenning et al. |
| 5,162,954 A | 11/1992 | Miller et al. |
| 5,262,907 A | 11/1993 | Duffy et al. |
| 5,371,724 A * | 12/1994 | Uno ........................ 360/78.14 |
| 5,585,976 A | 12/1996 | Pham |
| 5,737,145 A | 4/1998 | Jung |
| 5,777,816 A | 7/1998 | Hampshire et al. |
| 5,818,654 A | 10/1998 | Reddy et al. |
| 5,828,508 A | 10/1998 | Whaley et al. |
| 5,978,170 A | 11/1999 | Izumiya et al. |
| 6,038,097 A | 3/2000 | Le et al. |
| 6,104,558 A | 8/2000 | Greenberg et al. |
| 6,404,582 B1 | 6/2002 | Rodrigues de Miranda |

* cited by examiner

Primary Examiner—David Hudspeth
Assistant Examiner—Jason Olson
(74) Attorney, Agent, or Firm—Fellers, Snider, et al.

(57) ABSTRACT

Method and apparatus for performing a seek operation to move a data transducing head from an initial track to a destination track on a rotatable recording surface. A servo control circuit operates to sweep the head across the recording surface. Servo data from an intermediary track are transduced to obtain a detected angular position value for the head with respect to the recording surface. When the detected angular position value differs from a predicted angular position value for the head, the servo control circuit initiates an index qualification routine at the conclusion of the seek. The qualification routine involves transducing the servo data from the destination track to verify the accuracy of the predicted angular position value. In this way, the effects of spurious (false) index signals obtained from the servo data transduced during the seek operation are minimized, and unnecessary reinitializations of the servo control circuit are avoided.

13 Claims, 6 Drawing Sheets

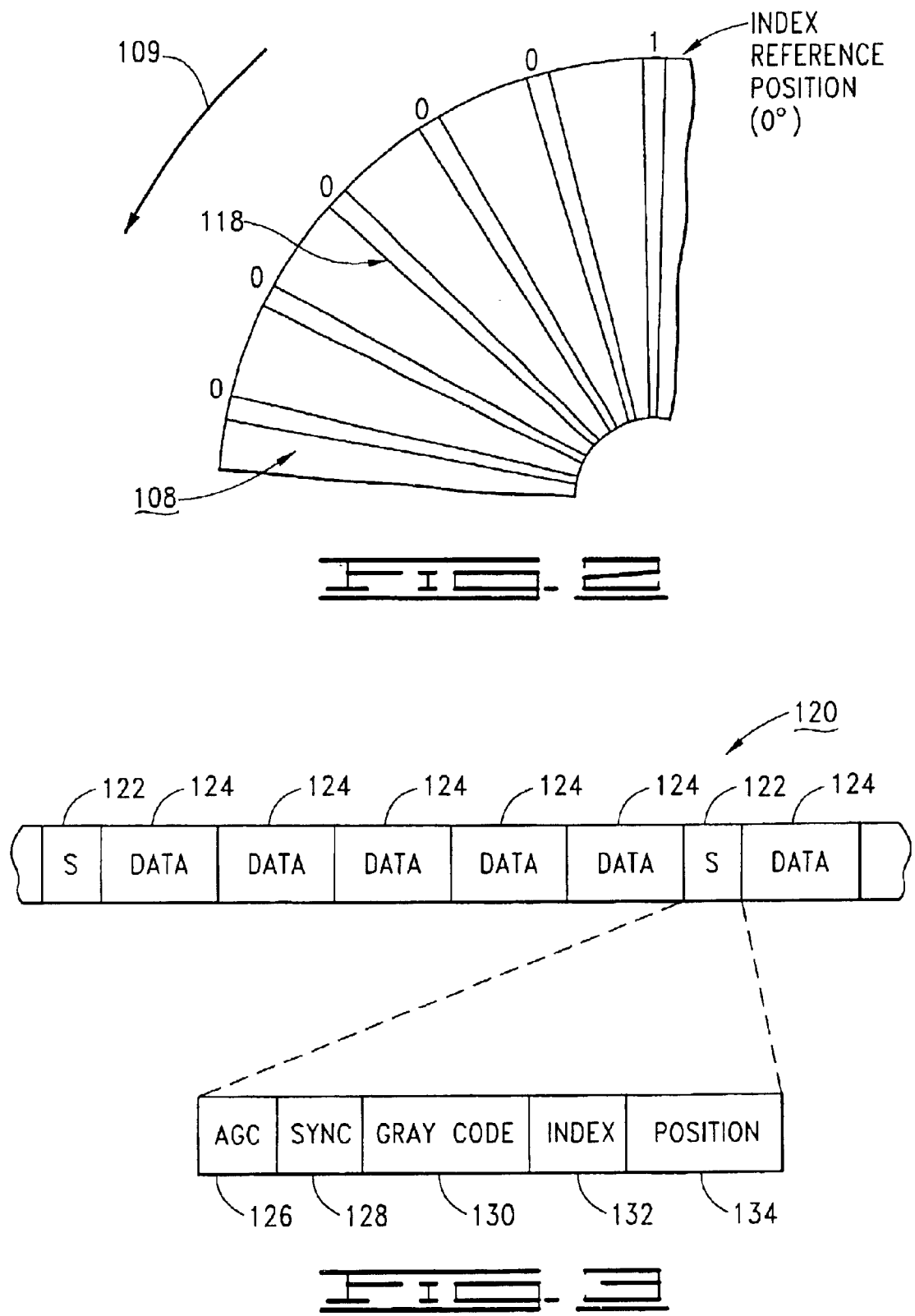

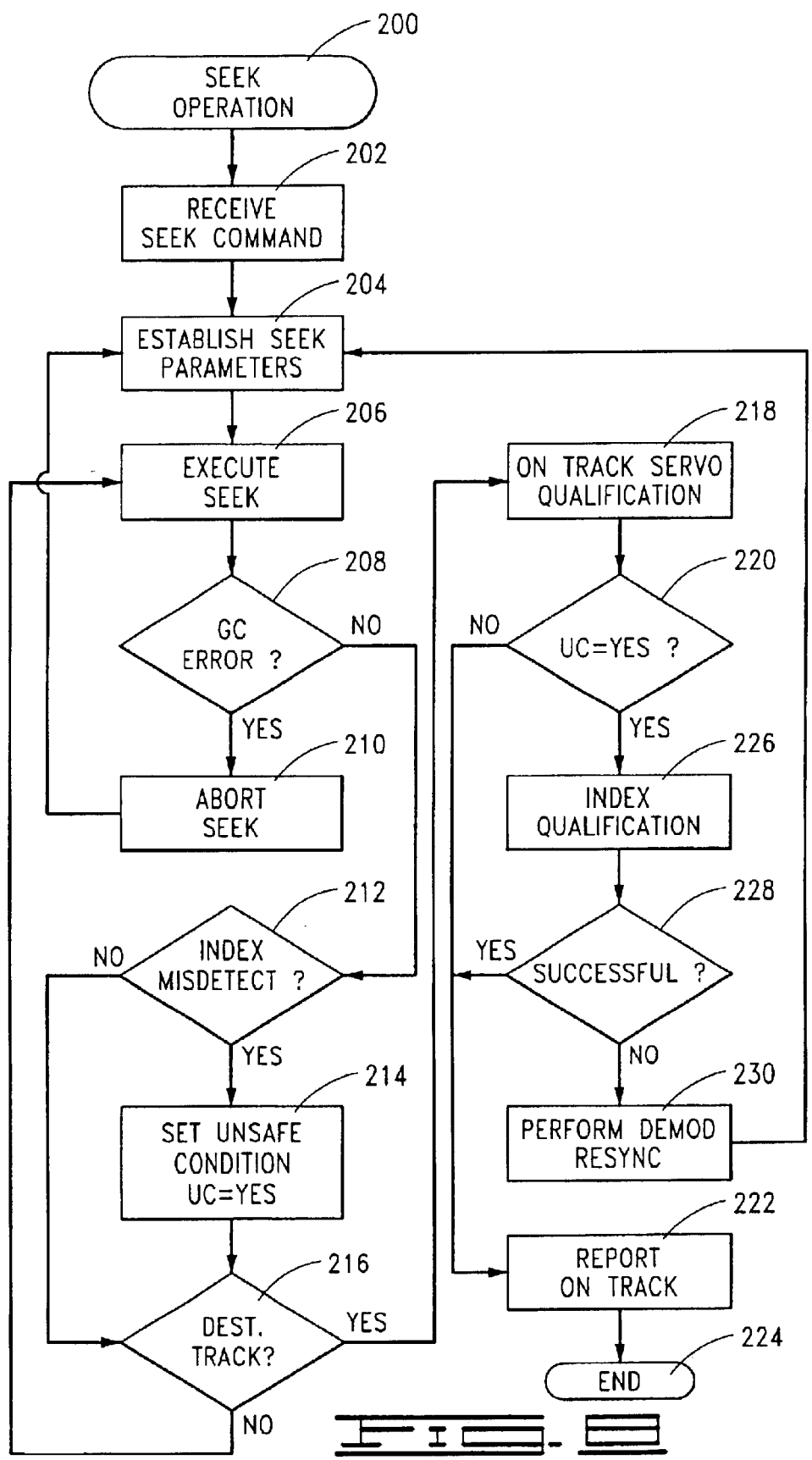

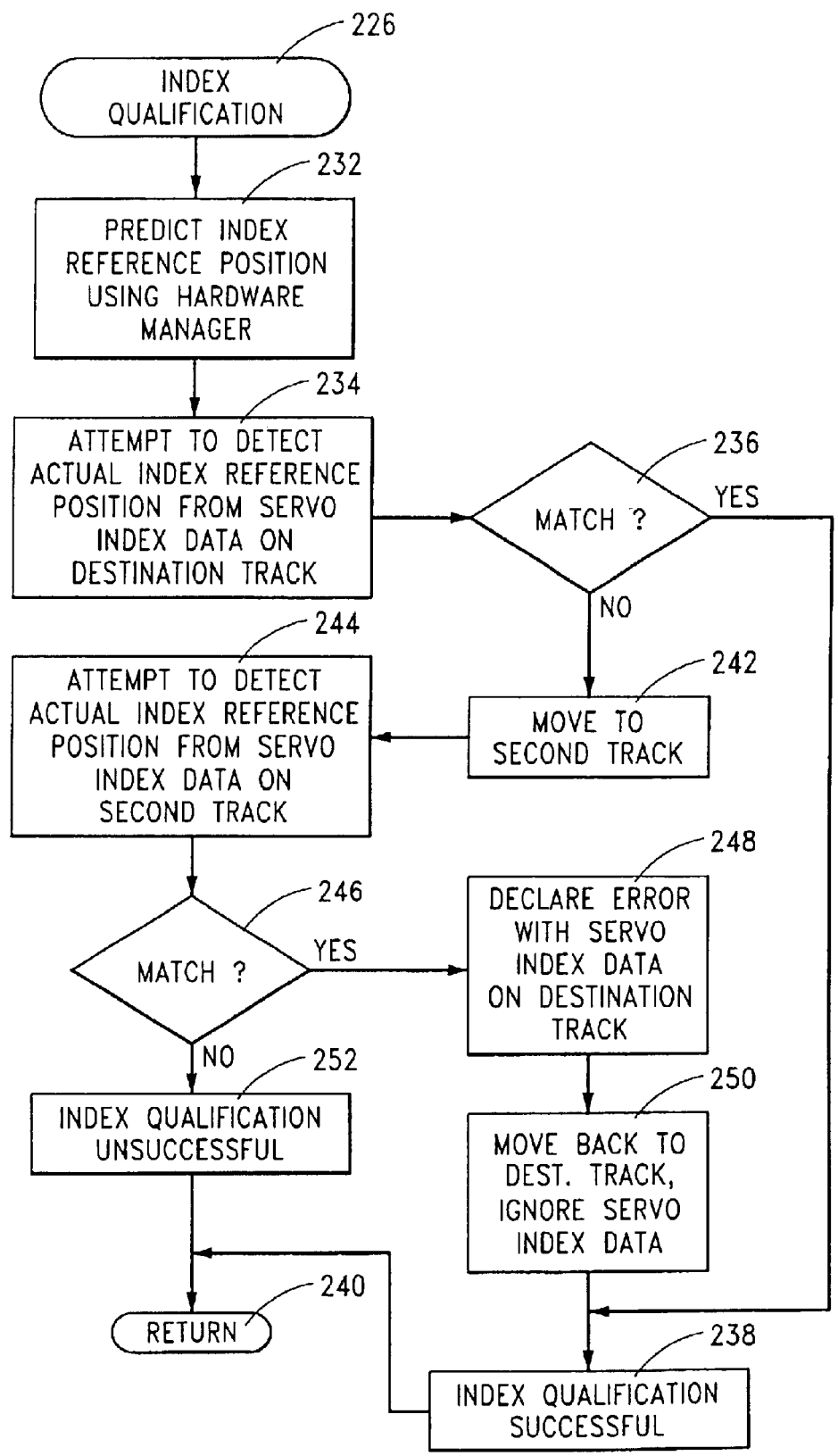

ADAPTIVE INDEX REFERENCE POSITION QUALIFICATION

RELATED APPLICATIONS

This application claims priority to U.S. Provisional Application No. 60/373,978 filed Apr. 18, 2002.

FIELD OF THE INVENTION

This invention relates generally to the field of digital data storage devices and more particularly, but not by way of limitation, to tracking and qualifying index servo data during a seek operation in a disc drive.

BACKGROUND

Disc drives are data storage devices used to store and retrieve digital user data in a fast and efficient manner. A typical disc drive stores such data on one or more rigid magnetic recording discs which are rotated at a constant high speed. An actuator controllably moves a corresponding number of data transducing heads to access data stored in tracks defined on the disc surfaces.

Servo data are written to the discs during disc drive manufacturing to define the tracks and to provide head positional information to a closed loop servo control circuit. The servo data are transduced and used by the servo control circuit during both seeking and track following operations.

The servo data include index data used to identify an index reference position on the disc surfaces. The index reference position corresponds to a "once-around" (i.e., zero degrees) angular reference for the discs. A typical servo control circuit tracks the angular position of the head by counting the number of servo fields encountered after each occurrence of the index reference position.

Because of track-to-track phase incoherence, a servo control circuit can misidentify the occurrence of the index reference position as the head is swept past the tracks during a high velocity seek operation. An index frame can be misdetected as a non-index frame, and vice versa. Such a false index detection can cause disorientation of the servo circuit (i.e., a loss of synchronization with the actual frame count), leading to uncertainty in the angular position of the head with respect to the disc.

Accordingly, there remains a continued need for improved approaches to maintaining an accurate indication of the angular location of a selected head during and after seek operations in a disc drive, and to eliminate unnecessary corrective actions (including full servo reinitialization operations) when spurious index servo signals are transduced during a seek.

SUMMARY OF THE INVENTION

As embodied herein and as claimed below, the present invention is generally directed to a method and apparatus for performing an index qualification routine during a seek operation.

In accordance with preferred embodiments, during a seek operation a servo control circuit operates to apply current to an actuator motor to sweep the head across the recording surface. Servo data from intermediary tracks between the initial track and the destination track are transduced to obtain detected angular position values for the head with respect to the recording surface.

When a particular detected angular position value differs from a corresponding predicted angular position value for the head, the servo control circuit declares an unsafe condition and initiates an index qualification routine at the conclusion of the seek. The qualification routine involves transducing the servo data from the destination track to verify the accuracy of the predicted angular position value.

The qualification routine serves to determine whether the servo control circuit actually lost synchronization with the disc, or whether spurious (false) index signals were obtained from the disc as the head was swept past the intermediary tracks during the high velocity seek operation. In this way, unnecessary and time consuming servo circuit reinitialization operations are avoided and data rate transfer performance is improved.

These and various other features and advantages which characterize the claimed invention will be apparent from a reading of the following detailed description and a review of the associated drawings.

BRIEF DESCRIPTION OF THE DRAWINGS

FIG. 2 generally illustrates the manner in which servo data are preferably arranged on the discs of the disc drive of FIG. 1.

FIG. 3 is a representation of a portion of a track of the disc of FIG. 2 illustrating the respective arrangement of servo data fields and user data fields (sectors), as well as a preferred format for the servo data fields.

FIG. 8 is a flow chart for a SEEK OPERATION routine, generally illustrative of steps carried out in accordance with preferred embodiments to maintain index synchronization of the servo control system of the disc drive with the actual location of a selected head during and after a seek operation.

FIG. 9 is a flow chart for an INDEX QUALIFICATION routine, generally illustrative of steps carried out in accordance with the routine of FIG. 8 to verify accuracy of the predicted angular position of the selected head at the conclusion of the seek operation.

DETAILED DESCRIPTION

Figure 1:
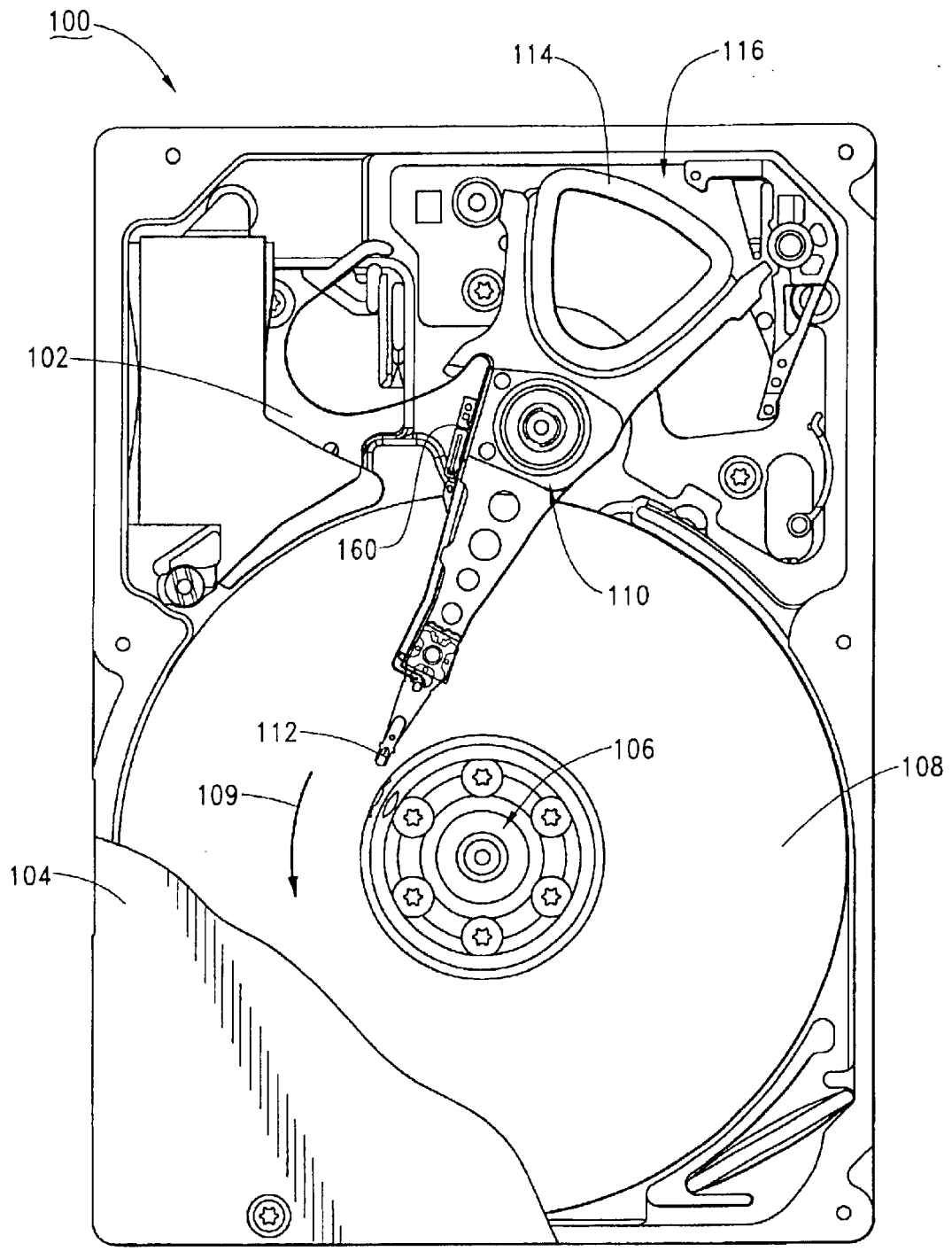
FIG. 1 is a top plan view of a disc drive data storage device constructed and operated in accordance with preferred embodiments of the present invention.

FIG. 1 shows a disc drive data storage device 100 of the type used to store and retrieve digital data. A base deck 102 cooperates with a top cover 104 (shown in partial cutaway) to form an environmentally controlled housing for the drive 100.

A spindle motor 106 supported within the housing rotates a number of rigid magnetic recording discs 108 in a rotational direction 109. An actuator 110 is provided adjacent the discs 108 and moves a corresponding number of heads 112 across the disc recording surfaces through application of current to an actuator coil 114 of a voice coil motor (VCM) 116.

FIG. 2 shows a portion of one of the discs 108. Servo wedges 118 radially extend from the innermost to the outermost radii of the disc recording surfaces. The servo wedges 118 are written during disc drive manufacturing to define a number of concentric tracks 120 as shown in FIG. 3. Each servo wedge 118 comprises a plurality of radially aligned servo data fields (S) 122.

User data fields (sectors) 124 are defined in the areas between adjacent servo data fields 120 during a disc drive formatting operation. The sectors 124 store fixed-size blocks (such as 512 bytes) of user data from a host device. While the number of servo wedges 118 per disc will depend upon the configuration of a particular drive, it will be contemplated for purposes of the present discussion that each disc surface in the disc drive 100 has a total of 200 such wedges 118. Thus, each selected head 112 will encounter a total of 200 servo fields over each full revolution of the associated disc 108.

While servo data fields can take any number of desired forms, the exemplary format of FIG. 3 includes an automatic gain control (AGC) field 126, a synchronization (sync) field 128, a Gray code (GC) field 130, an index field 132 and a position field 134. The AGC field 126 provides an oscillating (2T) pattern that allows the proper gain characteristics to be set in preparation for receipt of the remaining servo data. The sync field 128 provides a particular bit sequence for timing detection. The GC field 130 provides a unique track address to indicate the radial position of the head 112.

The index field 132 indicates the angular position of the head 112, and the position field 134 provides intra-track positioning data. Other configurations for the servo data field 122, including a different ordering of these respective fields, are readily envisioned.

Figure 4:
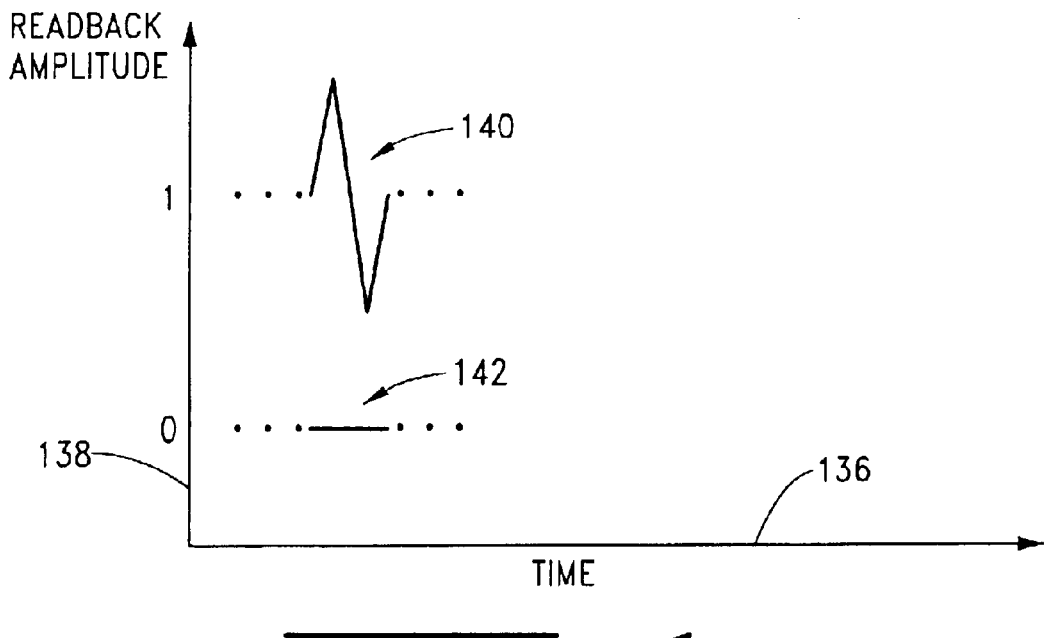
FIG. 4 is a graphical representation of index and nonindex readback signals in accordance with a preferred embodiment.

The index field 132 is preferably provided with one of two different (binary) magnetically stored patterns: a "non-index" pattern which corresponds to a logical zero (0), and an "index" pattern which corresponds to a logical one (1). FIG. 4 provides a graphical representation of one exemplary set of readback signals obtained from such binary index patterns, plotted against an elapsed time x-axis 136 and a readback signal amplitude y-axis 138.

A logical 1 pattern is written using a positive magnetic flux transition followed by a negative magnetic flux transition (i.e., a di-bit pattern), thereby providing a readback pattern such as generally shown at 140. A logical 0 pattern is indicated by an absence of any magnetic flux transitions, resulting in a baseline readback signal as generally shown at 142.

Figure 5:
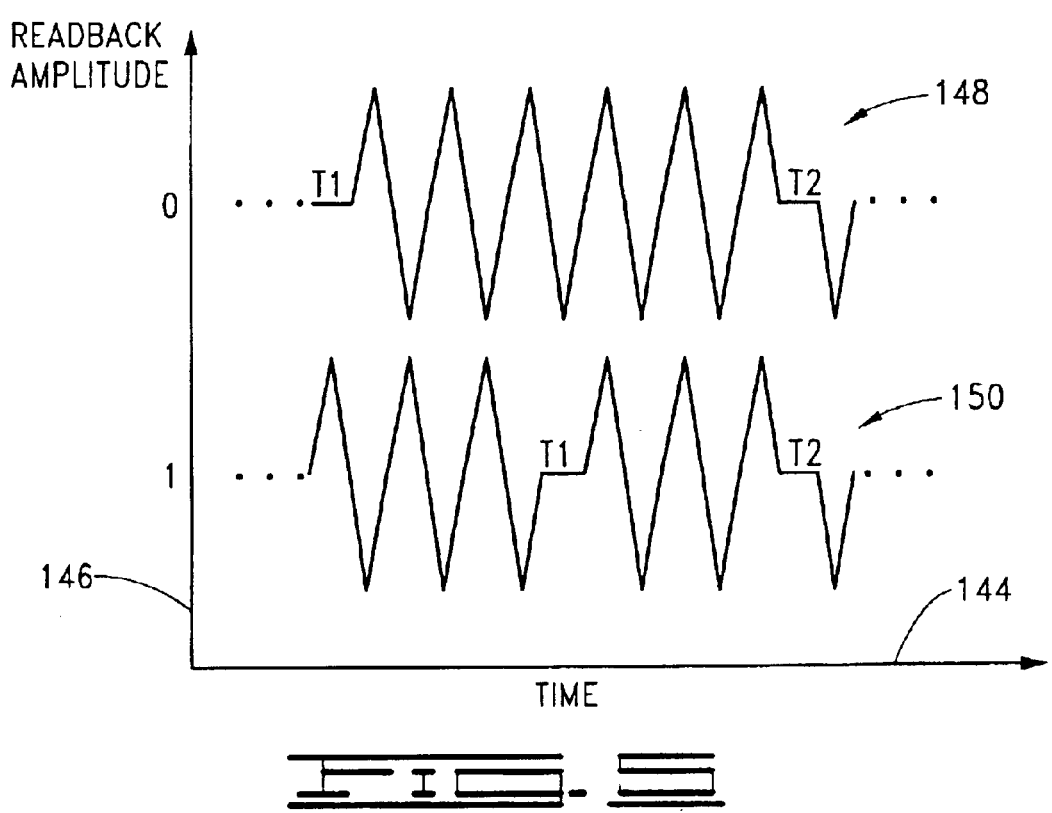
FIG. 5 is a graphical representation of index and nonindex readback signals in accordance with another preferred embodiment.

FIG. 5 provides a graphical representation of another exemplary set of readback signals plotted against an elapsed time x-axis 144 and an amplitude y-axis 146. Readback signals for the logical 0 and logical 1 patterns are respectively shown at 148, 150. Both signals include one-half cycle (180°) delays (denoted as timing marks T1, T2), with the number of cycles between the T1 and T2 marks being different for the respective signals. Other index mark configurations are readily contemplated.

Preferably, all of the index fields 132 in one selected servo wedge 118 (FIG. 2) from each disc surface are selected to store the logical 1 pattern, and the remaining index fields 132 in the remaining wedges 118 store the corresponding logical 0 pattern. In this way, the servo fields 122 with the logical 1 pattern are identified as corresponding to the index reference position (i.e., zero degrees), as indicated in FIG. 2. All of the tracks on a given disc surface thus share the same index reference position.

Drives having multiple disc surfaces may or may not orient the servo wedges 118 (FIG. 2) from each disc surface in a common vertical (angular) alignment. That is, the index reference position for a first selected disc surface may not necessarily correspond to the index reference position for a second disc surface within a disc stack. Nevertheless, even if the servo wedges 118 are staggered slightly from one disc surface to the next, the index reference positions for all of the disc surfaces will generally be in the same angular vicinity within the disc stack.

Figure 6:
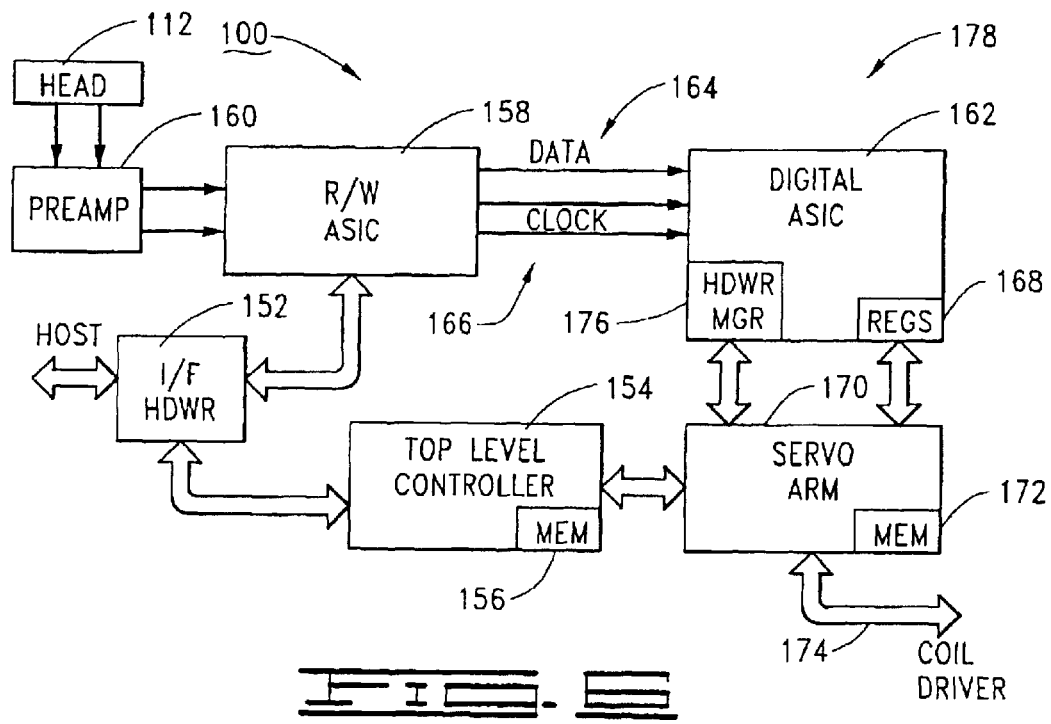
FIG. 6 is a functional block diagram of the disc drive of FIG. 1.

FIG. 6 provides a functional block diagram of communication and control electronics of the disc drive 100 of FIG. 1. Interface (I/F) hardware 152 provides a communication port with the host device and includes a data buffer, error correction code (ECC) circuitry, and a sequencer (disc manager). Overall disc drive control is provided by a top level controller 154 with associated memory 156. The controller operates in accordance with a selected industry standard host communications protocol, such as SCSI (small computer system interface).

A read/write application specific integrated circuit (R/W ASIC) 158 includes read and write channel circuitry to provide the requisite encoding for data to be written to the discs 108, and the requisite signal processing to decode transduced readback signals from the selected head 112. Such readback signals first undergo preamplification by a preamplifier/driver circuit (preamp) 160 mounted to the side of the actuator 110 (FIG. 1). Preferably, the R/W ASIC is a purchased component commercially available from a number of sources such as Marvel Technology, Inc.

The R/W ASIC 158 includes servo demodulation capabilities that enable the device to detect and output the servo data from the servo fields 122 to a digital ASIC 162. The servo data are provided along serial data lines 164 and a clock signal is provided via clock line 166. The digital ASIC 162 conditions the servo data by detecting the various different types of servo data (Gray code, position field data, etc.) and arranging the data into multi-bit form (e.g., 16-bits).

The conditioned servo data are loaded into registers 168 for retrieval by a servo ARM (advanced RISC (reduced instruction set computer) machine) device 170. The ARM device 170 is a servo processor which operates in accordance with programming in ARM memory 172 and instructions from the controller 154. The ARM device 170 outputs coil current commands via path 174 to a coil driver (not shown) which in turn applies the appropriate current to the actuator coil 114 (FIG. 1) to position the selected head as desired across the surface of the associated disc 108.

The digital ASIC 162 includes a hardware manager 176. The hardware manager 176 provides various timing control functions including tracking the number of servo data fields 122 that have passed the head 112 since the most recent index reference position. In this way, the hardware manager 176 provides a continual indication to the ARM device 170 of the angular position of the selected head 112. The hardware manager 176 is preferably configured to account for changes in the index reference position between disc surfaces (if any) when a head switch is made from a first selected head to a second selected head.

For reference, the heads 112, preamp 160, demodulation portions of the R/W ASIC 158, the digital ASIC 162, the ARM device 170, the coil driver and the coil 114 collectively form a closed loop servo control system (generally denoted at 178).

Figure 7:
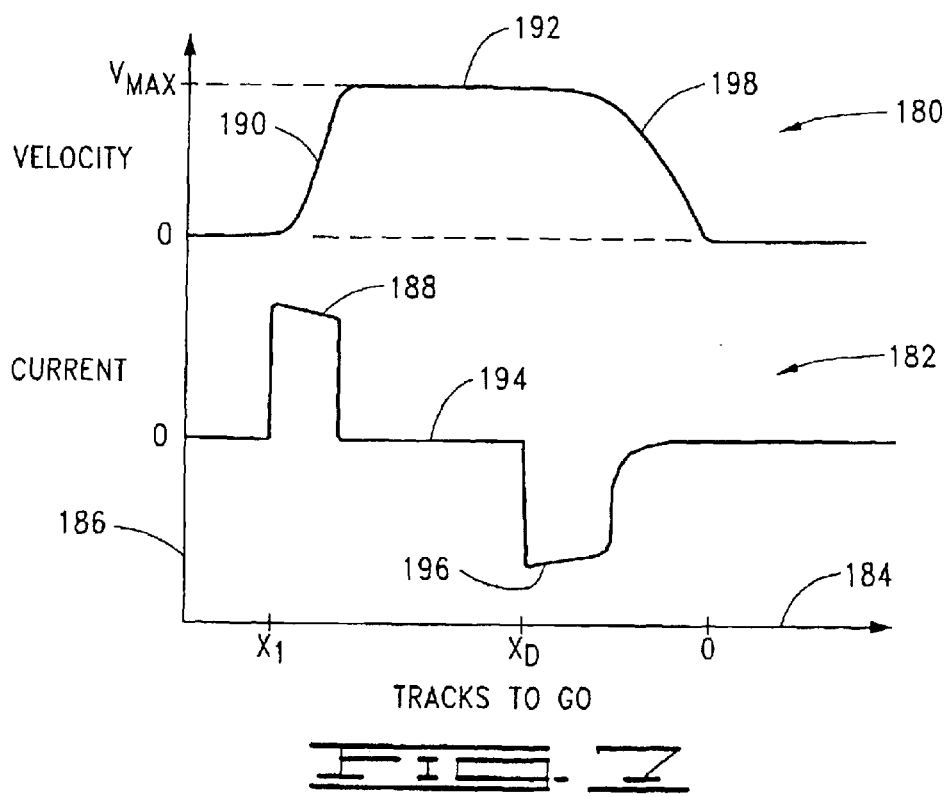
FIG. 7 provides a graphical representation of a preferred manner in which the disc drive carries out a seek operation to move a selected head from an initial track to a destination track.

The servo data from the servo data fields 122 are transduced and used by the servo control system 178 both during track following as well as during seek operations. By way of illustration, FIG. 7 provides a graphical representation of a seek velocity curve 180 and a seek current curve 182, representative of a velocity controlled seek operation carried out by the servo control system 178 to move a selected head 112 from an initial track to a destination track on the associated disc surface. The curves 180, 182 are plotted against a position x-axis 184 and a common amplitude y-axis 186. The position x-axis 184 is expressed in terms of "tracks to go" to the destination track (which is identified as "track 0").

During the seek, a relatively large amount of current is applied to the coil 114 (as shown at 188) to cause a rapid acceleration of the head 112 (portion 190) away from the initial track (position X1). The acceleration continues until the head 112 reaches a maximum velocity, VMAX (portion 192). Once the maximum velocity is attained, the current drops to substantially zero amps (portion 194) and the head 112 "coasts" at this velocity.

Once a deceleration point XD is reached, a relatively large amount of braking current (portion 196) is applied having a direction opposite that of the initial acceleration current 188. The braking current 196 nominally causes the velocity of the head to follow a selected deceleration profile (portion 198). The deceleration profile 198 is selected to nominally cause the head 112 to reach and settle onto the destination track in a minimal amount of time.

The foregoing seek operation is carried out by determining the radial velocity of the head 112 and continually adjusting the amount of applied current to cause the velocity to follow the desired trajectory. This velocity is determined through the detection and decoding of the servo data on the intermediary tracks between the initial track and the destination track.

Although the head 112 reaches a relatively high velocity during the seek, the servo control system 178 is nominally able to decode the GC fields 130 to detect each track-crossing during the seek. The servo control system 178 further nominally decodes the index fields 132 to maintain an accurate count of the angular position of the head 112.

While the foregoing seek methodology has been found operable, a number of factors including increased spindle motor speeds and increased data densities have made it generally more difficult to accurately detect the servo data while the heads 112 move past the tracks at a high velocity during a seek. Phase incoherence between adjacent tracks can lead to the misidentification of the index reference position as the head 112 is moved rapidly across the tracks. Such index misidentification events can cause a loss of synchronization between the servo control system 178 and the discs 108.

Accordingly, FIG. 8 provides a flow chart for a SEEK OPERATION routine 200, illustrative of steps carried out in accordance with preferred embodiments of the present invention to move the selected head 112 from an initial track to a destination track. The steps of the routine 200 are generally representative of programming stored in ARM memory 172 and used by the ARM device 170 during high velocity seek operations.

As shown by FIG. 8, upon receipt of a seek command from the top level controller 154, step 202, the ARM device 170 operates to establish the requisite seek parameters to define the desired seek operation, step 204. Such parameters include identification of the destination track, the desired head to be selected (if a head change is required), the number of tracks to go to the destination track, the calculated velocity profile, etc.

The ARM device 170 initiates the seek at step 206 by outputting the appropriate current command values to the coil driver (via path 174) to initiate the acceleration of the selected head 112 in the desired direction toward the destination track. The ARM device 170 uses the servo data transduced from intermediate tracks (at the sample rate of the demodulation circuitry) to count down the tracks remaining in the seek and to ascertain the actual velocity of the head 112. The ARM device 170 attempts to maintain an accurate indication of both the radial position and the angular position of the head 112 with respect to the disc 108 during the seek.

Decision step 208 inquires whether a Gray code (GC) error event occurs as the servo data samples are decoded; that is, whether the demodulated GC indicates the head 112 is somewhere other than where it should be at different times during the seek. It will be noted that such an error can arise when the GC is misdetected (so that the head 112 is actually where it should be located). However, such an error can also arise when the GC is correctly detected but a system error has caused the head to wind up somewhere other than where it should be during the seek.

By way of example, if a particular seek is performed to move the head 112 from track 1001 to track 2000, periodic servo data samples should show the head successively progressing toward the destination track. If a particular GC sample shows the head to be over track 2500 (which is beyond the destination track), the ARM device 170 can decide to ignore this one sample and instead rely on an observer module of the ARM programming to provide an estimate of radial position for that particular sample.

However, if subsequent samples also indicate the head to be actually near track 2500 (or the samples in general cannot be reliably decoded), the seek will be aborted as shown by step 210. The ARM device 170 will preferably apply a braking current to the actuator 110 to decelerate the head to a stop, determine which track the head 112 landed upon, and try again by initiating a new seek to the destination track from the track upon which the head landed.

When the R/W ASIC 158 is able to correctly demodulate the GC fields 132 and thereby maintain an accurate determination of the correct radial location of the head 112, the routine of FIG. 8 continues with another inquiry at step 212, namely whether an index misdetection has occurred. In other words, step 212 determines whether a possible loss of angular location tracking has occurred during the seek.

An index misdetection will generally arise if the demodulation circuitry of the R/W ASIC 158 identifies a non-index pattern as an index pattern, or identifies an index pattern as a non-index pattern. In either case, a particular bit or bits in the registers 168 will be set to reflect occurrence of a new index. This will generally conflict with the ongoing count by the hardware manager 176 based on the second most recent index indication. Thus, the index register 168 and the hardware manager 176 will disagree as to the occurrence of the most recent index reference position.

The ARM device 170 will accordingly declare the system 178 to be in an unsafe condition, as indicated by step 214, but will otherwise continue with the seek to the destination track, as indicated by decision step 216. This can occur so long as the servo system 178 maintains an accurate determination of the radial position of the head 112.

Once the head 112 reaches the destination track, the routine passes to step 218 where an on track servo qualification step takes place. Preferably, the servo qualification comprises the successful transducing of the servo data from a selected number of servo fields 122 on the destination track with the head 112.

For example, if the access command that brought about the seek operation is a read operation (i.e., the head 112 has been moved to the destination track to read data from one or more sectors 124), then the servo qualification step 218 will preferably be deemed successful when three successive position fields 134 on the destination track show the head 112 to be within the read fault tolerance specified for that track (e.g., ±20% of the track width from track center).

If the access command associated with the seek is a write operation, the servo qualification step 218 will preferably be deemed successful when five successive position fields 134 indicate the head 112 to be within the write fault tolerance specified for that track (e.g., ±15% of track width about track center).

Once the servo qualification step 218 is successfully completed, the routine passes to decision step 220 to determine whether the ARM device 170 declared an unsafe condition during the seek (i.e., whether UC=YES). If not, the ARM device 170 will provides a report to the controller 154 that the head 112 is on the destination track, step 222, and the seek routine ends at step 224. At this point the controller 154 coordinates the transfer of data with the associated sectors 124 on the destination track and selects the next access command to be executed. When a new access command is selected that requires a seek to a new destination track, the routine 200 is once again initiated.

Referring again to decision step 220, at such times that an unsafe condition has been declared, the routine of FIG. 8 passes to a subsequent index qualification step 226. As discussed below, the index qualification step 226 is performed to verify whether the hardware manager 176 is correctly synchronized with the disc 108.

If the qualification step is successful, as indicated by decision step 228 the routine passes to the on track report step 222 and the process ends as before. On the other hand, if the qualification step fails, the routine passes to a demodulation resynchronization step 230 ("demod resync").

The demod resync step 230 comprises a full resynchronization of the demodulation hardware and preferably includes declaration of an error condition to the controller 154, movement of the beads 118 to a known position (such as over landing zones at the innermost diameters of the discs 108), electrical reinitialization of the R/W ASIC 158 and the digital ASIC 160, and then controlled movement of the heads 118 to a second known starting position over a selected data track to acquire radial and angular positions of the head. The seek command is then reinitiated from the second known starting position.

Other reinitialization sequences are envisioned, but it will be recognized that all such sequences will typically take a substantial amount of elapsed time (such as on the order of 900 milliseconds). It is therefore desirable to only perform such full reinitialization sequences when absolutely necessary; that is, when the demodulation hardware has in fact lost synchronization with the discs 108.

FIG. 9 provides a generalized flow chart for the index qualification step 226 of FIG. 8. To better understand the flow of FIG. 9, it will be helpful to first briefly discuss the several possible outcomes that can occur during the index qualification process. These are listed in Table 1. It will be understood that the probability of each outcome is not the same, so that some of the listed outcomes will only likely occur on a relatively rare basis while others are likely to occur more frequently.

TABLE 1

| Possible Outcome | Hardware Manager Synchronized with Disc? | Errors in Decoding Index Patterns? |
|---|---|---|
| 1 | Yes | No |
| 2 | Yes | Yes |
| 3 | No | No |
| 4 | No | Yes |

The different outcomes represented in Table 1 represent different actual conditions of the drive 100: the hardware manager 176 is actually synchronized with the disc 108 or it is not; errors in the decoding of the index patterns do in fact occur or do not occur during the index qualification process. Because the ARM device 170 can only observe the existing count of the hardware manager 176 and observe the occurrence of index patterns at various times, the ARM device 170 attempts to deduce the actual state of the drive 100 and apply corrective actions accordingly.

The first possible condition is that the hardware manager 176 has correctly maintained proper synchronization with the disc 108 during the seek, and no errors occur during the subsequent transducing of the servo data from the destination track during the index qualification step. In this case it is contemplated that the index patterns subsequently detected from the destination track will indicate the index reference position to be exactly where the hardware manager 176 predicted it would be located.

Accordingly, after a statistically significant number of index patterns have been correctly detected in the right place on the destination track, the ARM device 170 will safely conclude that the misdetected index pattern(s) during the seek were spurious signals. The ARM device 170 can therefore release control to the controller 154 with a high degree of confidence that the hardware manager 176 is correctly synchronized with the disc 108.

The second possible outcome during the index qualification step 226 listed in Table 1 is that the hardware manager 176 has maintained proper synchronization with the disc 108, but errors are observed in the transduced index patterns once the head 112 reaches the destination track; that is, index patterns are identified at locations other than expected, or index patterns are not identified at the expected index reference position as the head 112 is maintained on the destination track. Such errors can be due to a number of factors, including anomalous conditions associated with the disc surface.

If the errors are nonrepeatable and go away after the head 112 remains on the destination track for an additional number of revolutions, and the index patterns thereafter are correctly identified at locations corresponding to what is estimated by the hardware manager 176, then the ARM device 170 can discount the errors as spurious signals and proceed as described above.

If the errors are repeatable, however, then the ARM device 170 is not in a position to determine whether errors exist in the transduced index signals or whether the hardware manager 176 is out of sync with the disc. However, instead of aborting the index qualification step at this point and proceeding with the full reinitialization process of step 230 (FIG. 8), the head 118 is preferably moved to a second, adjacent track to determine whether the index reference pattern on the second track can be properly detected and determined to match the count of the hardware manager 176.

If the hardware manager 176 is found to correctly match the detected index pattern from the second track, a hard erroneous index condition can be declared for the destination track and the disc drive 100 can take remedial steps with regard to the destination track (reallocate the data on the destination track, etc.). It will be noted that if a hard erroneous index condition in fact exists with the destination track, a full reinitialization of the hardware (step 230) will not cure this defect.

Thus, the index qualification step 226 of FIG. 9 begins with a prediction of the angular location of the index reference position using the ongoing count of the hardware manager 176, as indicated by step 232. The servo circuit 178 causes the head 118 to continue following the destination track while decoding the servo data from the servo data fields 122 in an attempt to detect the actual index reference position, step 234.

If the servo index data match that predicted by the hardware manager 176, as indicated by decision step 236, the index qualification process is deemed to be successful, step 238, and the process returns at step 240. On the other hand, if the servo index data do not match that predicted by the hardware manager 176, the head 118 is moved to a second track at step 242.

The second track is preferably selected as a track adjacent to the destination track (such as, for example, the next track in a direction toward the innermost diameter of the disc 108). A position controlled seek is preferably carried out using the servo position data (field 134, FIG. 3) to quickly advance the head 118 to the second track. The hardware manager 176 continues the ongoing counting of servo fields 122 at this time and maintains a prediction of the location of the next index reference position.

Once on the second track, the servo circuit 178 again monitors the servo data in an attempt to detect the actual index reference position, step 244. If the detected index reference position is found to match that predicted by the hardware manager 176, decision step 246, an error is declared with the servo index data on the destination track, step 248. This error is resolved by subsequently deallocating the existing data from the destination track (so that the destination track is not accessed in the future), or by noting the error for future reference so that the hardware manager count is used (and the servo index data are ignored) to track angular position during future accesses to the destination track.

The head 118 is next advanced back to the destination track at step 250, the index qualification process is deemed successful at step 238 and the routine returns as before at step 240.

Returning to decision step 246, when the index reference position from the servo index data of the second track also indicates a mismatch from the hardware manager 176, it is likely that the hardware manager encountered an error during operation and is no longer synchronized with the disc 108. The routine thus passes to step 252, the index qualification process is deemed unsuccessful, and the routine returns at step 240 so that the full reinitialization of the demod resync step 230 can be carried out.

It will now be understood that the present invention (as embodied herein and as claimed below) is generally directed to an apparatus and method for performing a seek operation in a data storage device (such as the disc drive 100).

In accordance with preferred embodiments, the seek operation is carried out by a servo control circuit (such as 178) to move a data transducing head (such as 118) from an initial track to a destination track on a rotatable recording surface (such as 108), and includes transducing servo data from an intermediary track between the initial track and the destination track as the head sweeps across the recording surface to obtain a detected angular position value for the head with respect to the recording surface (such as by steps 206, 212); declaring an unsafe condition when the detected angular position value differs from a predicted angular position value for the head (such as by step 214); and performing an index qualification routine after the head reaches the destination track to verify accuracy of the predicted angular position value (such as by step 226).

The predicted angular position value is preferably determined by an angular position prediction circuit (such as 176), and the method further preferably includes reinitializing the angular position prediction circuit when the index qualification routine determines that the predicted angular position value for the head is inaccurate (such as by step 230).

The index qualification routine further preferably comprises estimating a location of an index reference position on the destination track (such as by step 232); transducing servo data on the destination track in an attempt to detect the index reference position (such as by step 234) and verifying the accuracy of the predicted angular position value for the head when the estimated location of the index reference position corresponds to the detected location of the index reference position (such as by steps 236, 238).

The index qualification routine further preferably comprises moving the head to a second track adjacent the destination track when the estimated location of the index reference position fails to correspond to the detected location of the index reference position from the servo data transduced from the destination track (such as by step 242); transducing servo data on the second track in an attempt to detect the index reference position (such as by step 244); and verifying the accuracy of the predicted angular position value for the head when the estimated location of the index reference position corresponds to the detected location of the index reference position on the second track (such as by step 246).

The method further preferably comprises declaring an error condition associated with the servo data on the destination track when the estimated location of the index reference position corresponds to the detected location of the index reference position on the second track (such as by step 248).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising steps of estimating a location of an index reference position on a destination track of a storage medium, using a transducer to transduce servo data from the destination track in an attempt to detect the index reference position, and verifying the accuracy of a predicted angular position value of the transducer when the estimated location of the index reference position corresponds to the detected location of the index reference position.

2. The method of claim 1, wherein the predicted angular position of the transducer of the verifying step is determined in relation to servo data transduced by the transducer from intermediary tracks as the transducer is moved to the destination track.

3. The method of claim 1, further comprising providing an angular position prediction circuit to provide the predicted angular position value.

4. The method of claim 3, further comprising reinitializing the angular position prediction circuit when the verifying step determines that the predicted angular position value for the transducer is inaccurate.

5. The method of claim 1, wherein the verifying step further comprises moving the transducer to a second track adjacent the destination track when the estimated location of the index reference position fails to correspond to the detected location of the index reference position from the servo data transduced from the destination track, transducing servo data on the second track in an attempt to detect the index reference position, and verifying the accuracy of the predicted angular position value when the estimated location of the index reference position corresponds to the detected location of the index reference position on the second track.

6. The method of claim 5, wherein the performing step further comprises declaring an error condition associated with the servo data on the destination track when the estimated location of the index reference position corresponds to the detected location of the index reference position on the second track.

7. The method of claim 1, further comprising embedding the servo data on the surface in a plurality of angularly spaced servo data wedges, each servo wedge comprising a plurality of radially adjacent servo data fields, and wherein the predicted angular position value is determined in relation to an incrementing count of said servo data wedges passing adjacent the transducer during each revolution of the surface.

8. The method of claim 1, further comprising applying current to a motor to accelerate and then decelerate the transducer to move the head to the destination track, and wherein the transducing and the declaring steps are carried out during the applying step.

9. An apparatus comprising:
an angular position prediction circuit which provides a predicted angular position value for a transducer with respect to a data storage surface; and
a servo controller which verifies the accuracy of the predicted angular position value when an estimated location of an index reference position of the surface corresponds to a detected location of the index reference position determined from servo data transduced from the destination track by the transducer.

10. The apparatus of claim 9, wherein the servo circuit operates to verify the accuracy of the predicted angular position value when a mismatch occurs between the estimated angular position value and servo data transduced by the transducer on an intermediary track as the transducers moved to the destination track.

11. The apparatus of claim 10, wherein the predicted angular position of the transducer is determined in relation to servo data transduced by the transducer from intermediary tracks as the transducer is moved to the destination track.

12. The apparatus of claim 9, wherein the angular position prediction circuit comprises a hardware manager which counts passage of angularly spaced servo data fields on the surface during each revolution of the surface to provide the predicted angular position value for the transducer.

13. An apparatus, comprising:
a rotatable data storage surface on which servo data are stored to define a plurality of concentric tracks;
a controllably moveable transducer adjacent the surface; and
means for verifying the accuracy of a predicted angular position value of the transducer when an estimated location of an index reference position of the surface corresponds to a detected location of the index reference position determined from servo data transduced from a destination track.

* * * * *